United States Patent [19]

Fontaine et al.

[11] Patent Number: 4,529,347

[45] Date of Patent: Jul. 16, 1985

[54] METHOD AND A DEVICE FOR CONTROLLING A SILO UNLOADER

[75] Inventors: Jean-Guy Fontaine, Montreal; Réjean Sarrazin, Berthierville; Jean-Denis Poirier, Ste-Julie, all of Canada

[73] Assignee: Les Controles Vidomatic Inc., St-Theodore d'Action, Canada

[21] Appl. No.: 484,294

[22] Filed: Apr. 12, 1983

[30] Foreign Application Priority Data

Jul. 14, 1982 [CA] Canada .................................. 407303

[51] Int. Cl.$^3$ ............................................. B65G 65/40
[52] U.S. Cl. .................................. 414/315; 414/786
[58] Field of Search ............... 414/294, 295, 298, 307, 414/315, 786; 406/114

[56] References Cited

U.S. PATENT DOCUMENTS

| | | | |
|---|---|---|---|
| 2,430,203 | 11/1947 | Bailey | 414/295 X |
| 3,298,543 | 1/1967 | Laidig | 414/307 |
| 4,195,563 | 4/1980 | Budraitis et al. | |
| 4,289,437 | 9/1981 | Hansen | 414/315 |

*Primary Examiner*—Robert G. Sheridan
*Attorney, Agent, or Firm*—Robic, Robic & Ass.

[57] ABSTRACT

A method and a device for controlling a silo unloader of the type comprising a first electrical motor for driving a gathering apparatus located on the top of the bulk material and a second electrical motor operating a winch to which is suspended the gathering apparatus for lifting, holding in position at the same level or lowering this gathering apparatus into the silo. The method comprises the steps of measuring the current supplied to the first motor and controlling the second motor for lifting, holding in position at the same level or lowering the gathering apparatus in accordance with the measured value of the current. The control device comprises a current detector and an accurate rectifying amplifier for generating a measure signal in relation with the current supplied to the first motor. This measure signal is applied to a circuit comprising a level detector, a memory circuit, a lowering motion control circuit and circuits for generating a lifting time, a stopping time and a lowering time, these generating circuits acting on the second motor for obtaining lifting motion, holding in position at the same level or lowering motion of the gathering apparatus according to the amplitude of the measure signal. The device may be used in combination with any conventional silo unloader of the type described above used in a farm silo.

25 Claims, 7 Drawing Figures

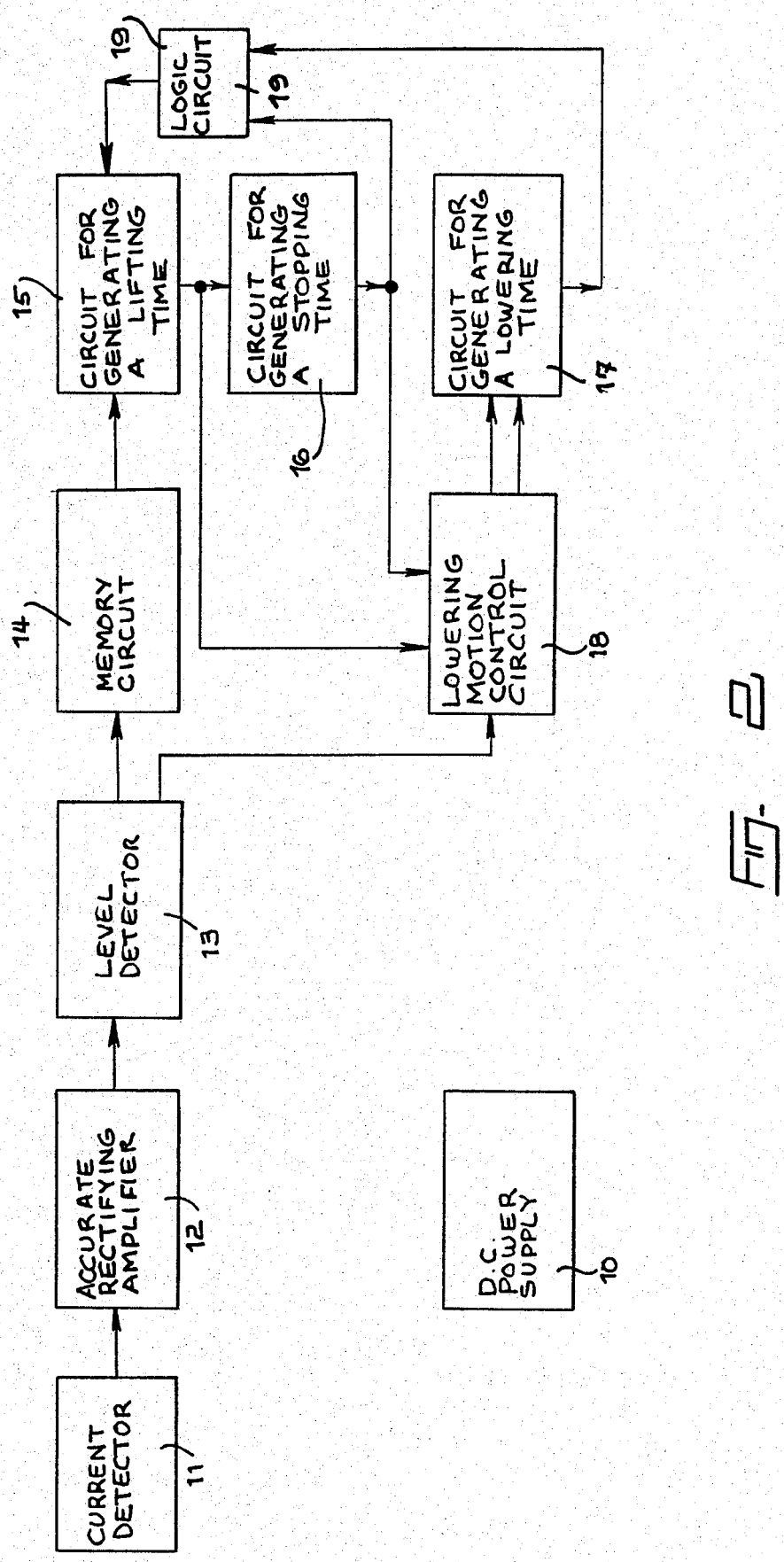

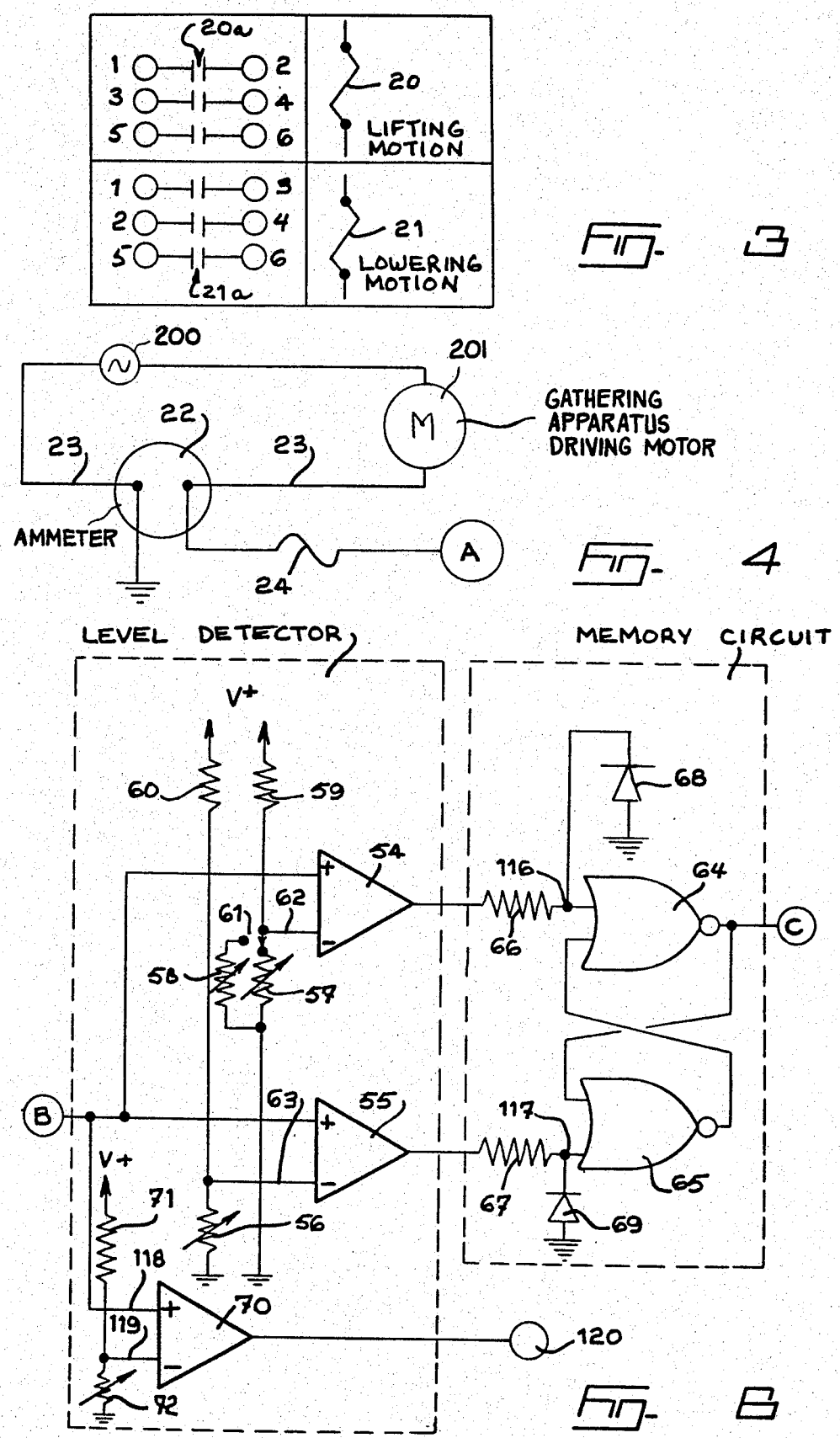

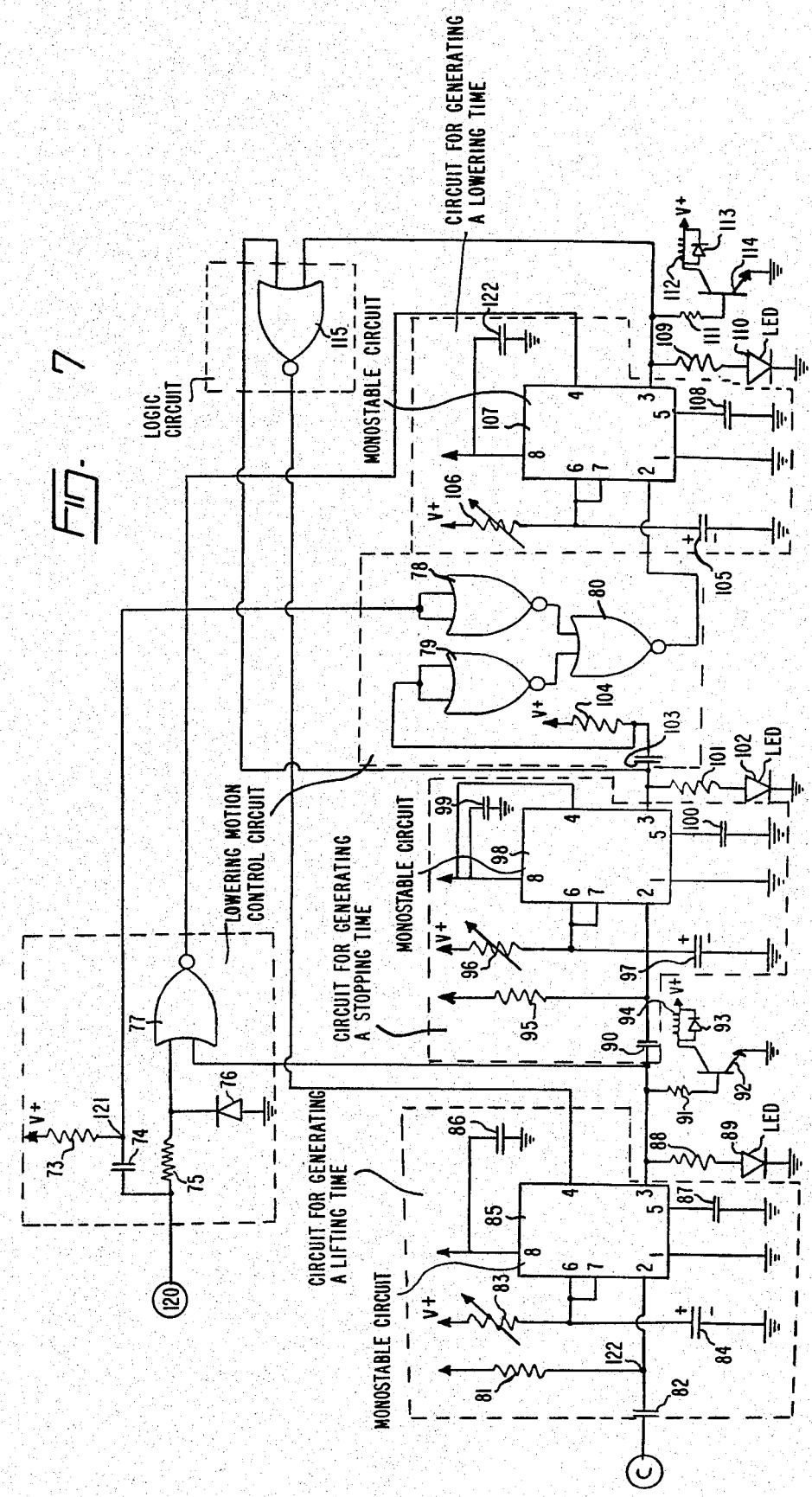

METHOD AND A DEVICE FOR CONTROLLING A SILO UNLOADER

BACKGROUND OF THE INVENTION

1. Field of the Invention

The present invention relates to a method and a device for controlling a silo unloader of the type comprising one or two electrical motors for driving a gathering apparatus located on the top of the bulk material stocked in the silo and a further electrical motor operating a winch to which is suspended the gathering apparatus to lower the gathering apparatus into the silo as the stocked material is unloaded.

More particularly, the present invention relates to a control method and device especially designed for protecting the motor(s) driving the gathering apparatus against possible overcurrents inherent to some operating conditions of the silo unloaded, which overcurrents often causes damages to the motor or mechanical failures of the gathering apparatus due to the supplementary torque generated by the motor when these overcurrents occur.

2. Background of the Invention

The gathering apparatuses which form part of the conventional silo unloaders used for unloading cylindrically shaped farm silos generally comprise an arm rotating around an axle located vertically in the middle of the silo, and having a length substantially equal to the radius of the silo. This arm is provided with a gathering chain or an endless screw feeding a blower or a similar device which evacuates the stocked material through a vertical corridor. The gathering apparatus is initially located on the top of the stocked bulk material and is gradually lowered as this material is unloaded. A winch to which is suspended the gathering apparatus and which is operated by an electrical motor is used for carrying out and controlling this lowering motion. It is to be noted that the expression <<material>> as used in the present specification means the silage or bulk feeding which is usually stocked in a farm silo.

The above-described conventional unloaders used for unloading farm silos have the disadvantage of operating with a constant lowering motion. The result of such an operation is that, when the material to be unloaded is compact or frozen, the arm becomes very difficult to operate and the electrical motor driving the gathering apparatus is subject to currents greater than the recommended ratings. This disadvantage occurs everytime the operator is busy or does not take into consideration the reading of the ammeter which indicates this overstepping and consequently, does not operate the manual commands for reversing or stopping the motor driving the winch to which the gathering apparatus is suspended. During these conditions of operation, the gathering apparatus is subject to severe mechanical loads which often result into mechanical or electrical failures causing extra costs of maintenance to the consumers and/or manufacturers who must increase the quality and consequently the cost of their product in order to meet with the requirements of such an improper operation.

SUMMARY OF THE INVENTION

An object of the present invention is to provide a method, as well as a device for carrying out this method for eliminating the disadvantage of the above described conventional silo unloaders by automatic control of the operation of the motor operating the winch for lifting or holding in position at the same level the gathering apparatus when the amplitude of the current supplied to the motor driving the gathering apparatus is too high. The motor driving the gathering apparatus is thereby protected against intensities of current overstepping the recommended ratings and, besides, the gathering is also protected against mechanical failures due to the supplementary torque generated by the motor during these overcurrents.

More particularly, the present invention proposes a method for controlling a silo unloader of the type comprising a gathering apparatus located on the top of a bulk material stocked in the silo, means supplied with an electrical current for driving this gathering apparatus, and means for positioning the gathering apparatus with respect to the level of the bulk material stocked within the silo. This method comprises the steps of measuring the current applied to the means for driving the gathering apparatus, and controlling the positioning means for lifting, holding in position at the same level or lowering the gathering apparatus in accordance with the value of the measured current.

The value of the measured current is preferably compared with a first and a second predetermined values, the second value being lower than the first one. The lifting motion of the gathering apparatus is carried out through the positioning means during a first predetermined period of time when the measured current oversteps the first predetermined value. After the end of the first period, the positioning means are stopped to hold in position at the same level the gathering apparatus during a second period of time which is interrupted when the measured current passes to a value smaller than the second predetermined value. The lowering motion of the gathering apparatus is carried out during a third period of time after the end of the second period. This period of lowering motion is interrupted when the measured current oversteps the second predetermined value.

Generally, the positioning means remains in a stopping position for holding the gathering apparatus at the same level when the measured current passes over the second predetermined value and remains located between the first and second predetermined values. The lowering motion of the gathering apparatus is generally carried out when the measured current becomes smaller than the second predetermined value.

The present invention also proposes a device for controlling a silo unloader of the type comprising a gathering apparatus located on the top of a bulk material stocked in the silo, means supplied with an electrical current for driving this gathering apparatus and means for positioning the gathering apparatus with respect to the level of the material stocked within the silo. This control device comprises measuring means for producing a measure signal in relation with the current supplied to the driving means and means for operating the positioning means for lifting, holding in position at the same level or lowering the gathering apparatus in accordance with the value of the measure signal.

In a preferred embodiment of the invention, the measuring means includes a current detector or measuring the current supplied to the driving means, and an accurate rectifying amplifier for generating the measure signal from the detected value of current.

According to another preferred embodiment of the invention, the operating means which receives the measure signal comprises a level detector delivering signals representative of the amplitude of the measure signal, a circuit for generating a lifting time, a circuit for generating a stopping time, and a circuit for generating a lowering time, which generating circuits acting on the positioning means in function of the signals representative of the amplitude of the measure signal. A memory circuit is also provided between at least one output of the level detector and the input of the circuit for generating the lifting time, which lifting time generating circuit having an output which is directly applied on the input of the circuit generating the stopping time. The control device for a silo unloader is further provided with a lowering motion control circuit for controlling in two points the operation of the circuit generating the lowering time in response to an output of the level detector and to the respective outputs of the circuits for generating the lifting and stopping times.

In a further preferred embodiment of the invention, the memory circuit and the lowering motion control circuit includes logic gates, the level detector comprises comparator circuits to each of which is applied a respective threshold voltage and the circuits generating the lifting time, the stopping time and the lowering time are formed by monostable circuits generating a pulse, when activated.

BRIEF DESCRIPTION OF THE DRAWINGS

The objects, advantages and other features of the present invention will become more apparent from the following non restrictive description of a preferred embodiment thereof, made in connection with the accompanying drawings, in which:

FIG. 2 is a block diagram of the circuit of a controlling device according to the invention;

FIG. 3 shows different external connections of a motor operating a winch to which is suspended a gathering apparatus within the silo, for producing a lifting or a lowering motion of this gathering apparatus;

FIG. 4 is a detailed embodiment of the current detector of FIG. 2;

FIG. 6, which appears on the same sheet of drawings as FIGS. 3 and 4, is a detailed embodiment of the level detector and the memory circuit of FIG. 2; and FIG. 7 is a detailed embodiment of the lowering motion control circuit, the circuits for generating the lifting, stopping and lowering times and the logic circuit forming part of the device for controlling a silo unloader shown in FIG. 2.

DETAILED DESCRIPTION OF THE INVENTION

Figure 1:
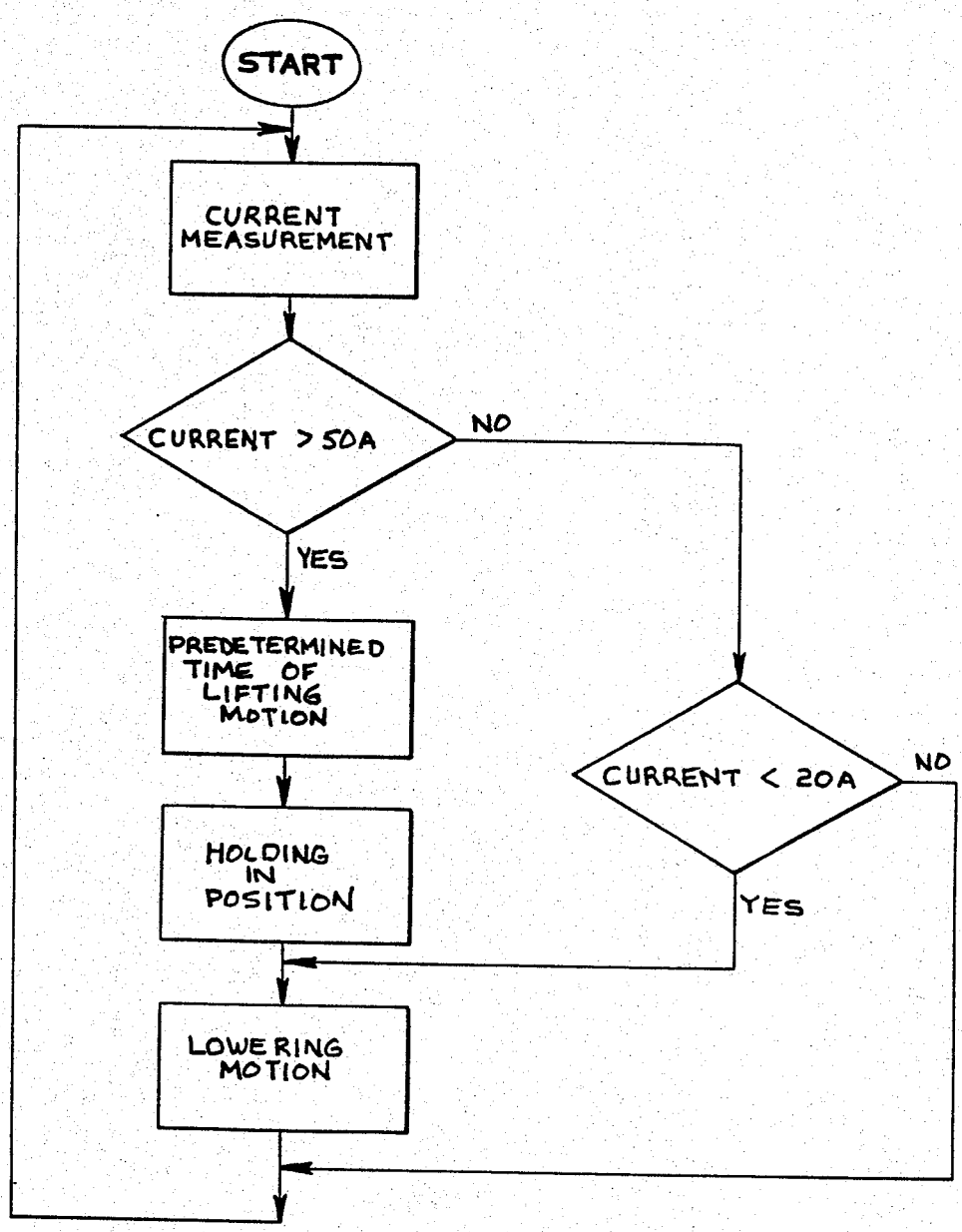
FIG. 1 is a logic block diagram illustrating the method for controlling a silo unloader according to the present invention.

The logic block diagram of FIG. 1 illustrates the different steps carried out in the method according to the present invention for controlling a silo unloader. The first step is to measure the actual current supplied to the means for driving the gathering apparatus, i.e. the motor of this apparatus. When this current is higher than a first predetermined value, for examples 50 amperes, means used for positioning the gathering apparatus with respect to the bulk material stocked within the silo, i.e. the motor of the winch to which is suspended the gathering apparatus, is operated for lifting the gathering apparatus during a first predetermined period to time. During a second period of time which may be interrupted, the motor of the winch is electrically disconnected, i.e. held in a stopping position until the current supplied to the motor driving the gathering apparatus is smaller than a second predetermined value which may be equal for example to 20 amperes. When the current passes from a value higher to a value smaller than 20 amperes during the lifting time, a predetermined stopping time is generated (not shown on FIG. 1). After the end or interruption of the stopping time, the motor operating the winch is again energized for lowering the gathering apparatus during a period of time which is interrupted when the measured current oversteps 20 amperes, as illustrated on FIG. 1.

Of course, a threshold value smaller than 50 amperes may be used depending on the different operating conditions.

When the measured current passes from a value smaller to a value higher than 20 amperes and remains located between 20 and 50 amperes, the motor operating the winch needs not be operated. If the measured current passes to a value smaller than 20 amperes, the motor operating the winch then is activated for lowering the gathering apparatus during a period of time which is also interrupted when the measured current oversteps 20 amperes.

An embodiment of control device for controlling the positioning means, i.e. the motor operating the winch of a silo unloader according to the present invention as a function of the amplitude of the current supplying the motor of the gathering apparatus will now be described with reference to FIGS. 2 to 9.

As illustrated on FIG. 2, this control device comprises a power supply 10 for supplying an electrical DC voltage and current to the other electronic elements 12 to 19 of the device for controlling the silo unloader.

The alternating current supplied to the motor driving the gathering apparatus is measured by a current detector 11. The measured value is then amplified and rectified through an accurate rectifying amplifier 12 and the so-obtained DC output voltage is transmitted to a level detector 13 which generates signals representative of the amplitude of this DC voltage which corresponds to the measured alternating current. A part of the signals generated by the level detector 13 are supplied to a memory circuit 14 having an output which controls the operation of the circuit for generating a lifting time 15, which generating circuit acting on the motor of the winch through a relay (not shown). The output of the circuit 15 is connected with the input of a circuit 16 for generating a stopping time at the end of the lifting time. A lowering motion control circuit 18 controls into two points the operation of the circuit for generating a lowering time 17 which acts on the motor of the winch through another relay (not shown) as will be seen hereinafter, in response to an output of the level detector 13 (i.e. to the amplitude of the DC voltage corresponding to the measured current), the output of the circuit for generating a lifting time 15 and the output of the circuit generating the stopping time 16. The circuit for generating the lifting time 15 is not operated when one of the two circuits 16 or 17 is in operation. This non-operation of the lifting time generating circuit is controlled by a logic circuit 19 having an output connected to an input of the circuit 15 and having two inputs connected to the outputs of the circuits 16 and 17, respectively.

For a better understanding of the operation of the present invention, FIG. 3 illustrates the different connections that may be used for allowing control of the motor driving the winch of the silo unloader. For a lifting motion of the gathering apparatus, the terminals 1, 3 and 5 of the motor must be respectively connected to the terminals 2, 4 and 6 through the contacts 20$_a$ of a relay 20. For a lowering motion of the gathering apparatus the terminals 1, 2 and 5 of the motor must be respectively connected to the terminals 3, 4 and 6 through contacts 21$_a$ of a relay 21. These two relays 20 and 21 which are operated by the device for controlling the silo unloader according to the present invention as illustrated, for example only, on FIG. 3, must be selected in function of the connections required to the type of motor used for driving the winch for lifting or lowering the gathering apparatus, as well as in function of the amplitude of the current required by this motor. FIG. 3 provides a non-limitative example of the means that can be used for controlling the operation of the motor of the winch for lifting or lowering the gathering apparatus and thereby to give a better understanding of the action of the relays 20 and 21 on the motor of the winch. The method used for controlling these relays will be explained hereinafter in more details with reference to FIG. 7. It is to be noted that the outputs of the circuits for generating the lifting and lowering times control the operation of the relays 20 and 21, respectively.

The current detector 11 as shown in FIG. 2 is detailed on FIG. 4. This detector is formed with the terminals of the ammeter 22 already mounted on the conventional silo unloaders in series with the electrical line 23 which transmits electrical power from an alternating source 200 to the motor 201 driving the gathering apparatus. A first terminal of the ammeter 22 is connected to the ground of the electronic circuit of the device for controlling a silo unloader while the second terminal of this ammeter is connected to a point A of the circuit through a fuse 24 provided for protecting the circuit of the controlling device when a too high current is supplied to this circuit. The function of this current detector 11 (see FIG. 2) is the transmission, to the circuit of the device for controlling a silo unloader, of the alternating voltage present between the terminals of the ammeter 22. This alternating voltage is directly proportional to the current supplying the or the two motors 201 driving the gathering apparatus, which current flowing through line 23.

Figure 5:
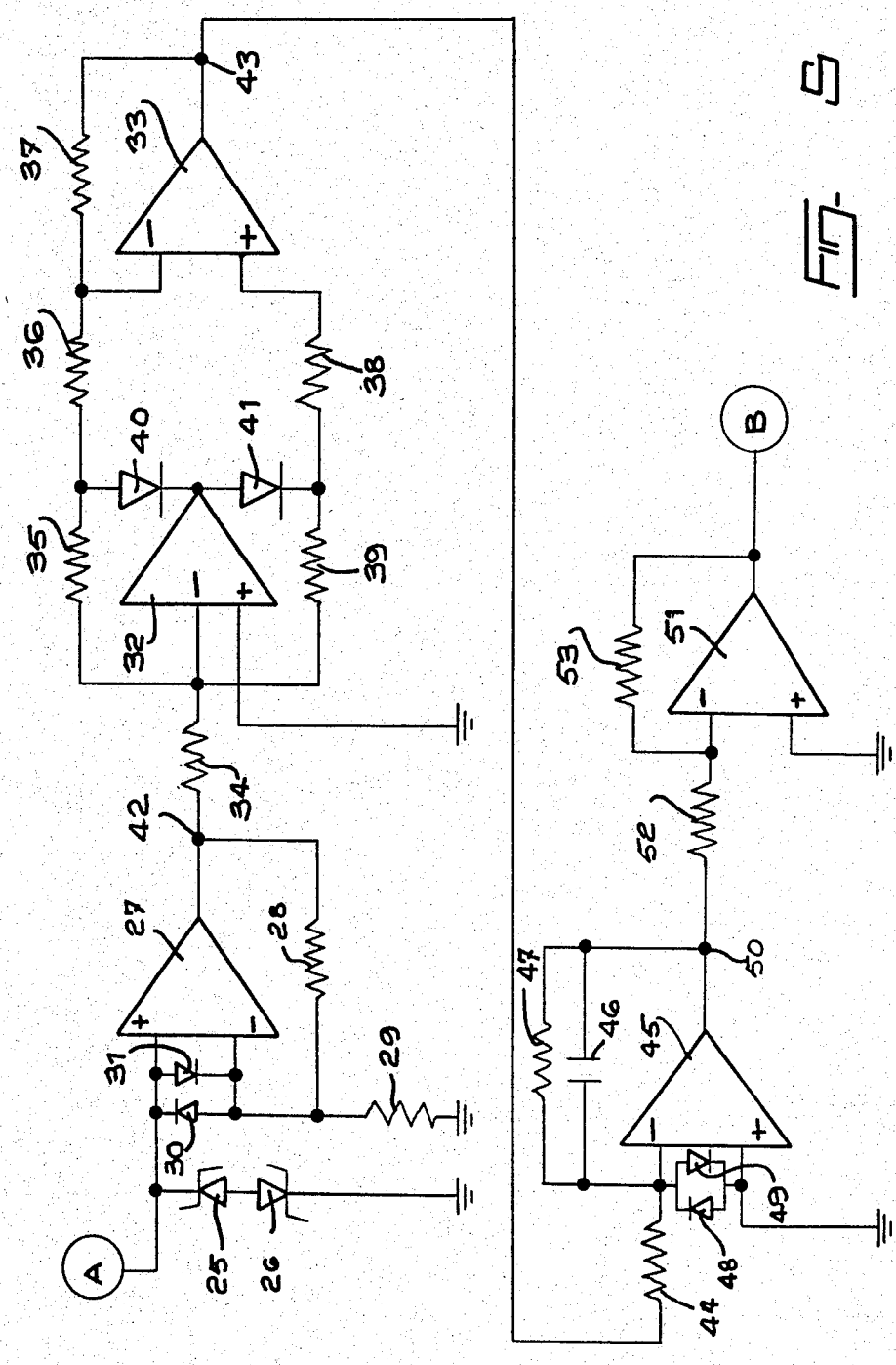
FIG. 5 is a detailed embodiment of the accurate rectifying amplifier of FIG. 2.

The current detector of FIG. 4 is connected to the accurate rectifying amplifier of FIG. 5 through point A. As illustrated on FIG. 5, the input of this rectifying amplifier is provided with a voltage limiting circuit formed by two Zener diodes 25 and 26 connected in series and having their respective anode interconnected and their cathode connected to point A and to the ground, respectively. The limiting circuit is followed by an amplifier stage having a positive gain and comprising an operational amplifier 27, the gain of which being selected by two resistors 28 and 29. Two diodes 30 and 31 are connected in parallel with their conductive paths oriented in reverse directions between the non-inverting and inverting inputs of the operational amplifier 27 for protection of these inputs.

The output of this positive gain amplifier stage is connected to the input of a rectifying amplifier stage. This stage comprises two operational amplifiers 32 and 33, resistors 34 to 39 and two diodes 40 and 41 interconnected as illustrated in FIG. 5 in order to amplify and rectify the version at point 42 of the alternating voltage supplied by the current detector of FIG. 4.

The rectified voltage at point 43 is integrated by an integrating circuit comprising an operational amplifier 45, a resistor 44 connected between point 43 and the inverting input of the operational amplifier 45 and a capacitor 46 in parallel with a resistor 47 connected between the output and the inverting input of the amplifier 45. Two diodes 48 and 49 are provided for protecting the inerting and non-inverting inputs of the operational amplifier 45. A DC voltage negative with respect to the ground of the circuit is thereby produced at the output 50 of the integrating circuit.

The negative DC voltage at the output 50 is amplified by an amplifier stage having a negative gain and comprising an operational amplifier 51. The gain of this amplifier stage is adjusted by the value of the resistors 52 and 53. A DC voltage positive with respect to the ground of the circuit is thereby produced at the output B of the operational amplifier 51, which positive DC voltage being function of the detected alternating voltage which is proportional to the current supplying the motor driving the gathering apparatus. This positive DC voltage is used by the circuit controlling the relays and thereby the operation of the motor driving the winch.

The integrated circuits containing the operational amplifiers are supplied with a positive and negative DC voltages with respect to the ground and provided by the DC power supply 10 of FIG. 2 and all the integrated circuits of the circuit of the device for controlling a silo unloader are provided with filtering capacitors connected between their supply pins and the ground (not shown).

The structure and operation of the part of the circuit of the device for controlling a silo unloader according to the invention which processes the DC voltage generated at point B by the accurate rectifying amplifier of FIG. 5 will now be described with reference to FIGS. 6 and 7 of the drawings.

The DC voltage at point B is transmitted to the level detector shown on FIG. 6. This level detector comprises two comparators, formed by two operational amplifiers 54 and 55, to which are applied threshold voltages. The threshold voltage applied to the input 63 of the comparator 55 corresponds to a current slightly lower than 20 amperes supplied to the motor driving the gathering apparatus and is selected with a voltage divider constituted by a resistor 60 and potentiometer 56. The threshold voltage applied to the input 62 of the comparator 54 is selected with a voltage divider formed by the resistor 59 and potientiometers 57 or 58 through the switch 61. This switch 61 is used to select the threshold voltage applied at the input 62 for different operating conditions; for example in winter and in summer, a threshold voltage corresponding to 50 and 40 amperes respectively can be applied to the input 62 of the comparator 54 and selected by switch 61.

When the silo unloader is started, the alternating current supplied to the motor driving the gathering apparatus may rise to values up to 80 amperes, due to operational factors, namely the supplementary intensity of current necessary for starting of the motor and the location of the gathering apparatus with respect to the bulk material to be unloaded. The voltage at point B therefore passes, as the starting of the motor occurs, from a level lower than the threshold voltage applied to the input 63 of the comparator 55 to a level higher than the threshold voltage applied to the input 62 of the comparator 54.

When the voltage at point B passes from a level lower to a level higher than the threshold voltage applied to the input 63, the input 117 of the logic gate 65 passes from a <<low>> logic level to a <<high>> logic level thereby producing a <<low>> logic level at the output of the NOR gate 65, and the input 116 being <<low>>, the output of the NOR gate 64 becomes <<high>>. In the same manner, each time the voltage at point B passes from a level lower to a level higher than the threshold voltage applied to the input 62 of the comparator 54, the input 116 of the gate 64 passes from the <<low>> level to the <<high>> level thereby producing a high-to-low level transition at the output of the NOR gate 64, i.e. at point C.

The logic gates 64 and 65 form the memory circuit 14 of FIG. 2. The output of the comparators 54 and 55 are connected respectively to an input of the logic gates 64 and 65 through resistors 66 and 67. Two diodes 68 and 69 connected as shown on FIG. 6 are used for protecting the inputs 116 and 117 of the logic gates 64 and 65.

This high-to-low level transition occuring at point C is transmitted to an input 2 of a monostable circuit 85 constituting the circuit for generating a lifting time 15 of FIG. 2 through a capacitor 82, this input 2 being generally held to a high level by the action of a resistor 81 connected to the DC supply voltage. The monostable circuit 85 generates, in response to the above-mentioned high-to-low level transition, a positive pulse at its output 3 which corresponds to the lifting time of the motor operating the winch and having a width which can be selected by adjusting the values of the potentiometer 83 and the capacitor 84. The pulse at the output 3 is applied to the base of a transistor 92 through a resistor 91 for supplying a current to the coil 94 of the relay 20 (FIG. 3) thereby operating the motor of the winch for lifting the gathering apparatus and decreasing the current supplied to the motor driving this gathering apparatus. The pulse at the output 3 also supplies a light emitting diode (LED) 89 through a resistor 88 to indicate that the motor of the winch is operated for lifting the gathering apparatus. The operation of the monostable circuit 85 is also controlled through its terminal 4 by the output of a NOR gate 115 which prevents the operation of the monostable circuit 85 when one of monostable circuits 98 or 107 is generating a pulse, i.e. when one of their respective outputs 3 is <<high>>. As the monostable circuits 85 and 107 energize respectively the coils 94 and 112 of the relays 20 and 21 of FIG. 3, the NOR gate 115 prevents the simultaneous operation of these two relays, because such operation may cause damages to the motor in the occurrence of an incorrect operation of the circuit. As will be explained hereinafter, a similar function is performed by the NOR gate 77. This logic gate 115 constitutes the logic circuit 19 of FIG. 2.

As illustrated on FIG. 7, the monostable circuits 85, 98 and 107 may be constituted by integrated circuits of the type NE 555 polarized for a monostable operation in response to high-to-low level transitions of the signals applied to their respective inputs 2. These monostable circuits are also provided with filtering capacitors 86, 87, 99, 100, 122 and 108.

When a high-to-low level transition occurs at the output 3 of the monostable circuit 85, the operation of the relay 20 and the light emitting diode 89 is interrupted. This high-to-low level transition is transmitted to the input 2 of the monostable circuit 98 through a capacitor 90, this input 2 being generally maintained to the <<high>> level by the resistor 95 connected to the positive DC supply voltage. The monostable circuit 98 then generates at its output 3 a positive pulse having a width which can be selected by adjusting the potentiometer 96 and the capacitor 97. This positive pulse supplies a light emitting diode 102 through a resistor 101 for indicating a stopping of the motor driving the winch.

In the meantime, the voltage at point B is also applied to the input 118 of a comparator 70 forming part of the level detector of FIG. 6, a threshold voltage being applied to the input 119 of this comparator. This threshold voltage corresponds to an alternating current of about 20 amperes supplied to the motor driving the gathering apparatus and is selected by adjusting the voltage divider formed by resistor 71 and potentiometer 72. When the voltage at point B passes from a value higher to a value lower than the threshold voltage applied to the input 119, the output 120 of the comparator 70 passes from the <<high>> level to the <<low>> level and this high-to-low level transition is transmitted to point 121 through the capacitor 74, this point 121 being generally held to the <<high>> level by a resistor 73 connected to the positive DC supply voltage (FIG. 7). This high-to-low level transition thereby produces a <<high>> level at the output of the NOR gate 78 and if the pulse at the output 3 of the monostable circuit 98 is present at the same time, the output of the NOR gate 79 is <<low>>. The output of the NOR gate 80 which was <<high>> before the high-to-low level transition at point 120 occurs, passes to the <<low>> level and activate the input 2 of the monostable circuit 107, as its input 4 is held to the <<high>> level by the output of the NOR gate 77 having its two inputs at the <<low>> level, one being connected to the output of the monostable circuit 85 and the other at the output of the comparator 70 through a resistor 75 and being provided with a protecting diode 76. The monostable circuit 107 therefore generates a positive pulse at its output 3 in response to the high-to-low level transition at its input 2, which pulse supplying the coil 112 of the relay 21 through the transistor 114 and resistor 111 and the light emitting diode 110 through the resistor 109. The width of the positive pulse generated at the output 3 of the monostable circuit 107 is selected by adjusting the values of the potentiometer 106 and the capacitor 105.

Diodes 93 and 113 are connected in parallel with the coils 94 and 112 for protecting these coils against possible overvoltages occuring between the terminals of these coils when the current through them is suddenly interrupted.

If the voltage at point B has not passed to a value lower than the threshold voltage applied to the input 119 of the comparator 70, i.e. if the current supplied to the motor driving the gathering apparatus of the silo unloader has not passed to a value smaller than 20 amperes before the end of the stopping time generated by the monostable circuit 98, the high-to-low level transition occuring at the output 3 of the monostable circuit 98 at the end of the stopping time is transmitted to the inputs of the NOR gate 79 through a capacitor 103, thereby producing a <<high level>> at the output of this NOR gate 79, and at the same time, the point 121 being <<high>> and the output of the NOR gate 78 being <<low>>, the output of the NOR gate 80 therefore passes from the <<high>> level to the <<low>> level, which transition normally activates the monostable circuit 107 to generate a positive pulse at its output 3. However, the output 120 of the comparator 70 being <<high>> and the output of the monostable circuit 85 being <<low>>, the output of the NOR gate 77 and therefore the input 4 of the monostable circuit 107 are <<low>>, thereby preventing the monostable circuit 107 to generate a positive pulse, i.e. the lowering time. At the end of the positive pulse generated by the monostable circuit 98, the resistor 104 connected to the positive DC supply voltage maintains the two inputs of the NOR gate 79 to the <<high>> level. The output of the NOR gate 79 therefore remains <<low>>. When the voltage at point B passes from a value higher to a value lower than the threshold voltage applied to the input 119, the high-to-low level transition occuring at point 120 is transmitted directly to the input 2 of the monostable circuit 107 through the capacitor 74 and the NOR gates 78 and 80, and at the same moment, the two inputs of the NOR gate 77 being <<low>>, the input 4 of the monostable 107 is <<high>> and the circuit 107 therefore generates a positive pulse corresponding to the lowering time at its output 3.

The values of the potentiometers 83 and 106 and the capacitors 84 and 105 are preferably selected for generating a lowering pulse at the output 3 of the monostable circuit 107 which has a width smaller than the lifting pulse generated at the output 3 of the monostable circuit 85, for a better operation of the device for controlling a silo unloader.

Similarly, when the value of the voltage at point B passes from a value higher to a value lower than the threshold voltage applied to the input 119 during the lifting time or pulse generated at the output 3 of the monostable circuit 85, the high-to-low level transition at point 121 does not activate the monostable circuit 107 since the output of the monostable circuit 85 is <<high>> thereby producing a <<high>> level at the output of the NOR gate 77 and therefore at the input 4 of the monostable circuit 107. In this case, the lowering pulse is generated by the monostable circuit 107 when the high-to-low level transition of the stopping pulse generated by the monostable circuit 98 is transmitted to the input 2 of the monostable circuit 107 through the capacitor 103 and the NOR gate 79 and 80 as at the same moment, the point 121 is <<high>>. The inputs of the NOR gate 79 remains <<low>> only during a time equal to the period of time required to charge the capacitor 103 through the resistor 104. The same phenomenon occurs with respect to the logic level changes appearing at point 121 and the respective inputs of the monostable circuits 85 and 98.

In the three preceeding cases, the lowering pulse of the monostable circuit 107 is generated only after the current supplying the motor driving the gathering apparatus of the silo unloader passes to a value lower than about 20 amperes corresponding to the threshold voltage applied to the input 119 of comparator 70.

When the voltage at point B passes from a level lower to a level higher than the threshold voltage applied to the input 119 of comparator 70 during the monostable circuit 107 is generating the lowering pulse, point 120 passing to the high level and the input 4 of the monostable circuit 107 to the low level, the lowering pulse generated by the monostable circuit 107 is thereby interrupted.

Therefore, when the voltage at point B passes from a value lower to a value higher than the threshold voltage applied to the input 119 and remains located between the threshold voltages applied to inputs 119 and 62 of comparator 70 and 54 respectively, the motor operating the winch remains to its stopping position.

If the voltage at point B passes from a value located between the values of the threshold voltages applied to the inputs 119 and 62 to a value smaller than the threshold voltage applied to the input 119, the high-to-low level transition at point 120 is transmitted to the input 2 of the monostable circuit 107, in a manner similar to the one described above. The monostable circuit 107 then generates a lowering pulse which is interuupted when the voltage at point B oversteps the threshold voltage applied at the input 119.

It is to be noted that a heat dissipating resistor may be provided within the casing enclosing the circuit of the device for controlling a silo unloader in order to heat this circuit when the silo unloader is used at low temperatures.

A timing apparatus may also be added to the device for controlling a silo unloader according to the present invention for selecting the time of operation of the silo unloader for obtaining the required quantity of unloaded bulk material without any watching or surveillance.

The manual commands of the silo unloader remains operational for permitting a manual control when necessary and a switch allows the selection of the desired control mode, i.e. an automatic or manual control mode.

Since the present invention has been described with reference to a particular embodiment, modifications in the above described cricuit, such as for example replacement of some elements by equivalent elements or of part of the circuit by another different circuit carrying out the same function, or replacement of the winch controlling the level of the gathering apparatus within the silo by another mechanical device, or application of the present invention to other kind of unloader, can be made without modifying the nature and scope of the present invention.

The embodiments of the invention in which an exclusive property or privilege is claimed are defined as follows:

1. A method for controlling a silo unloader of the type comprising a gathering apparatus located on the top of a bulk material stocked in the silo, means supplied with an electrical current for driving this gathering apparatus, and means for positioning the gathering apparatus with respect to the level of said material stocked within the silo, said method comprising the steps of measuring the current supplied to said means for driving the gathering apparatus and controlling the positioning means for lifting, holding in position at the same level or lowering the gathering apparatus in accordance with the value of the measured current, the positioning means being controlled for holding the gathering apparatus in position at the same level during time periods having variable durations depending on the value of the measured current.

2. The method of claim 1, wherein the positioning means are controlled for lifting the gathering apparatus during a first predetermined period of time when the value of the measured current oversteps a first predetermined value.

3. The method of claim 2, wherein the positioning means are stopped for holding in position at the same level the gathering apparatus during a second period of time after the end of the first period.

4. The method of claim 3, wherein the second period of time is interrupted when the value of the measured current becomes lower than a second predetermined value, said second value being smaller than the first value.

5. The method of claim 3, wherein the positioning means are controlled for lowering the gathering apparatus during a third period of time after the end of the second period.

6. The method of claim 4, wherein the positioning means are controlled for lowering the gathering apparatus during a third period of time after the end of the second period, said third period being interrupted when the value of the measured current oversteps the second predetermined value.

7. The method of claim 1, wherein the positioning means are stopped for holding in position at the same level the gathering apparatus when the value of the measured current oversteps a first predetermined value and remains located between said first predetermined value and a second predetermined value higher than the first value.

8. The method of claim 1, wherein the positioning means are controlled for lowering the gathering apparatus when the measured current passes from a value higher to a value smaller than a predetermined value.

9. The method of claim 8, wherein the lowering motion of the gathering apparatus is interrupted when the measured current oversteps said predetermined value.

10. The method of claim 2, wherein the positioning means are stopped for holding in position at the same level the gathering apparatus during a second predetermined period of time after the end of the first period, when the measured current passes from a value higher to a value smaller than a second predetermined value during said first period, said second value being smaller than the first value.

11. The method of claim 10, wherein the positioning means are controlled for lowering the gathering apparatus during a third period of time after the end of the second predetermined period, said third period being interrupted when the current oversteps said second predetermined value.

12. A device for controlling a silo unloader of the type comprising a gathering apparatus located on the top of a bulk material stocked in the silo, means supplied with an electrical current for driving this gathering apparatus, and means for positioning the gathering apparatus with respect to the level of said material stocked within the silo, said device comprising measuring means for producing a measure signal in relation with the current supplied to the driving means and means for operating the positioning means for lifting, holding in positon at the same level, for lowering the gathering apparatus in accordance with the value of said measure signal, said operating means comprising means for controlling the positioning means so as to hold in position at the same level the gathering apparatus during time periods having variable durations depending on the value of the measure signal.

13. The device of claim 12, wherein the driving means comprises an electrical motor, and the positioning means comprises a winch to which is suspended the gathering apparatus and an electrical motor for operating this winch.

14. The device of claim 12, wherein the measuring means comprises a current detector for sensing the value of the current supplied to the driving means, and an amplifier for generating said measure signal in accordance with said sensed value.

15. The device of claim 14, wherein the current supplied to the driving means is an alternating current and said amplifier is an accurate rectifying amplifier.

16. The device of claim 12, wherein the operating means comprise a level detector receiving said measure signal and generating signals representative of the amplitude of the measure signal, a circuit for generating a lifting time, a circuit for generating a stopping time and a circuit for generating a lowering time, said generating circuits controlling the positioning means in accordance with said representative signals.

17. The device of claim 16, wherein said operating means comprises a memory circuit mounted between at least one output of the level detector and an activation input of the circuit for generating the lifting time.

18. The device of claim 16, wherein the circuit for generating the lifting time has an output directly connected with an activation input of the circuit for generating the stopping time.

19. The device of claim 16, wherein the operating means further comprises a lowering motion control circuit including a first logic circuit for allowing or preventing the operation of the circuit for generating the lowering time in response to an output of the level detector and to the output of the circuit for generating the lifting time, said lowering motion control circuit also including a second logic circuit for generating an activation signal which is applied to the circuit for generating the lowering time, in response to said output of the level detector and the output of the circuit for generating the stopping time.

20. The device of claim 16, wherein the operating means further comprises a logic circuit having two inputs connected to the output of the circuits for generating the stopping time and the lowering time, respectively, and an output connected to an input of the circuit for generating the lifting time, said logic circuit thereby allowing or preventing the operation of said circuit for generating the lifting time.

21. The device of claim 16, wherein the circuit for generating the lifting time and the circuit for generating the lowering time each controls the positioning means through an electromagnetic relay permitting the transmission of an electrical current to said positioning means.

22. The device of claim 14, wherein the current detector is constituted by two terminals of an ammeter connected in series with a line transmitting the electrical current to the driving means.

23. The device of claim 15, wherein the accurate rectifying amplifier comprises in series an amplifier stage having a positive gain and receiving as input said sensed value of current, a rectifying amplifier stage, an integrator stage and an amplifier stage having a negative gain.

24. The device of claim 16, wherein the level detector comprises comparator circuits, a respective predetermined threshold voltage being applied to each of said comparator circuits.

25. The device of claim 16, wherein the circuits for generating the lifting, stopping and lowering times are each formed with a respective monostable circuit, the monostable circuit forming the circuit for generating the lifting time and the monostable circuit forming the circuit for generating the lowering time each generating a positive pulse during respective periods of time not overlapping with each other, said lifting and lowering pulses each activating the positioning means through a first and a second electromagnetic relays, respectively, for transmitting an electrical current to said positioning means.

* * * * *